US 10,648,673 B2

(12) United States Patent
Kim

(10) Patent No.: US 10,648,673 B2
(45) Date of Patent: May 12, 2020

(54) COMBUSTOR

(71) Applicant: HANWHA AEROSPACE CO., LTD., Changwon-si (KR)

(72) Inventor: Ik Soo Kim, Changwon-si (KR)

(73) Assignee: HANWHA AEROSPACE CO., LTD., Changwon-si (KR)

(*) Notice: Subject to any disclaimer, the term of this patent is extended or adjusted under 35 U.S.C. 154(b) by 0 days.

(21) Appl. No.: 15/742,332

(22) PCT Filed: Oct. 13, 2015

(86) PCT No.: PCT/KR2015/010778
§ 371 (c)(1),
(2) Date: Jan. 5, 2018

(87) PCT Pub. No.: WO2017/007068
PCT Pub. Date: Jan. 12, 2017

(65) Prior Publication Data
US 2018/0202662 A1    Jul. 19, 2018

(30) Foreign Application Priority Data

Jul. 7, 2015 (KR) .................. 10-2015-0096790

(51) Int. Cl.
F23R 3/34 (2006.01)
F23R 3/42 (2006.01)
(Continued)

(52) U.S. Cl.
CPC ................. *F23R 3/34* (2013.01); *F02C 3/34* (2013.01); *F02C 7/22* (2013.01); *F23C 5/08* (2013.01);
(Continued)

(58) Field of Classification Search
CPC .... F23R 3/44; F23R 3/16; F23R 3/346; F23R 3/28; F23R 3/42; F23R 3/06; F23R 3/14;
(Continued)

(56) References Cited

U.S. PATENT DOCUMENTS 4,389,848 A    6/1983    Markowski et al.
6,499,993 B2   12/2002   Steber et al.
(Continued)

FOREIGN PATENT DOCUMENTS

JP    2011-163626 A    8/2011
KR    10-2010-0061538 A    6/2010
WO    2009/078891 A2    6/2009

OTHER PUBLICATIONS

International Search Report, issued by International Searching Authority in corresponding International Application No. PCT/KR2015/010778, dated Feb. 22, 2016, (PCT/ISA/210).
(Continued)

Primary Examiner — Alfred Basichas
(74) Attorney, Agent, or Firm — Sughrue Mion, PLLC

(57) ABSTRACT

A combustor includes a combustion tube having a cylindrical shape with a combustion space where fuel is combusted and including an inlet through which the fuel is introduced, an outlet through which a gas generated when the fuel is combusted is discharged, and a protrusion protruding inward from a wall surface between the inlet and the outlet; an injection unit configured to inject fuel into the combustion tube through the inlet of the combustion tube; and an additional injection unit located on the protrusion of the combustion tube and configured to inject fuel into the combustion tube.

12 Claims, 17 Drawing Sheets

(51) Int. Cl.
| | |
|---|---|
| *F02C 7/22* | (2006.01) |
| *F23C 6/04* | (2006.01) |
| *F23R 3/16* | (2006.01) |
| *F23C 9/00* | (2006.01) |
| *F23R 3/44* | (2006.01) |
| *F23R 3/28* | (2006.01) |
| *F02C 3/34* | (2006.01) |
| *F23C 5/08* | (2006.01) |
| *F23C 9/06* | (2006.01) |
| *F23C 9/08* | (2006.01) |
| *F23R 3/06* | (2006.01) |
| *F23R 3/14* | (2006.01) |

(52) U.S. Cl.
CPC ............ *F23C 6/047* (2013.01); *F23C 9/006* (2013.01); *F23C 9/06* (2013.01); *F23C 9/08* (2013.01); *F23R 3/06* (2013.01); *F23R 3/14* (2013.01); *F23R 3/16* (2013.01); *F23R 3/28* (2013.01); *F23R 3/346* (2013.01); *F23R 3/42* (2013.01); *F23R 3/44* (2013.01); *F23R 2900/00015* (2013.01)

(58) Field of Classification Search
CPC .. F23R 3/34; F23R 2900/00015; F23C 9/006; F23C 9/08; F23C 9/06; F23C 5/08; F23C 6/047; F02C 7/22; F02C 3/34
See application file for complete search history.

(56) References Cited

U.S. PATENT DOCUMENTS

| | | | |
|---|---|---|---|
| 7,665,309 B2 * | 2/2010 | Parker | F23R 3/28 60/740 |
| 8,112,216 B2 | 2/2012 | Davis, Jr. et al. | |
| 8,407,892 B2 | 4/2013 | DiCintio et al. | |
| 2007/0259296 A1 | 11/2007 | Knoepfel | |
| 2009/0084082 A1 * | 4/2009 | Martin | F01D 9/023 60/39.281 |
| 2011/0067402 A1 | 3/2011 | Wiebe et al. | |
| 2014/0174090 A1 | 6/2014 | Chen et al. | |

OTHER PUBLICATIONS

PCT/ISA/220, dated Feb. 22, 2016, issued by the International Searching Authority in counterpart International Patent Application No. PCT/KR2015/010778.

Written Opinion, issued by International Searching Authority in corresponding International Application No. PCT/KR2015/010778, dated Feb. 22, 2016, (PCT/ISA/237).

* cited by examiner

COMBUSTOR

TECHNICAL FIELD

Embodiments relate to a combustor, and more particularly, to a combustor for improving combustion performance and achieving low emission combustion by increasing a gas recirculation flow.

Technology for minimizing environmental pollution caused by combustion of fossil fuel is important in designing and operating a combustor. Research has recently been conducted on moderate or intense low-oxygen dilution (MILD) combustion to improve the efficiency of a combustor and achieve low emission combustion. MILD combustion is also named flameless oxidation (FLOX) or high-temperature air combustion (HiTAC).

A combustor is a component that performs a function of generating power for an engine or a gas turbine by combusting fuel. With global trends of stricter regulations on nitrogen oxide and carbon monoxide emissions, MILD combustion which enables stable combustion by mixing air with a high-temperature exhaust gas that is discharged as a waste product even in a combustor to reduce an oxygen concentration and deliver a flow of high-temperature air is applied.

BACKGROUND ART

Korean Patent Publication No. 2010-0061538 discloses technology of supplying fuel and a diluted solution in a secondary combustion zone downstream of a primary combustion zone of a combustion engine. The technology performs secondary combustion that assists combustion taking place in the primary combustion zone by providing a manifold on a wall that surrounds the secondary combustion zone, locating an injector nozzle in the manifold, and injecting the fuel in the secondary combustion zone. Although the technology may reduce the amount of fuel injected in the secondary combustion zone, there is no interaction between the combustion in the primary combustion zone and the combustion in the secondary combustion zone. That is, combustion performance in the primary combustion zone is not improved by fuel injection in the secondary combustion zone.

U.S. Pat. No. 4,389,848 discloses a structure in which a fuel injector includes a primary nozzle located on the upstream side of a burner and a secondary nozzle located on the downstream side and fuel and air are recirculated by injecting the fuel through the secondary nozzle. However, in this structure, since the secondary nozzle is located on an extension of the central axis of the primary nozzle of the burner, recirculation effect of the fuel and the air is not sufficient.

(Patent Document 1) Korean Patent Publication No. 2010-0061538 (Jun. 7, 2010)

(Patent Document 2) U.S. Pat. No. 4,389,848 (Jun. 28, 1983)

DETAILED DESCRIPTION OF THE INVENTION

Technical Problem

An objective of embodiments is to provide a combustor for improving combustion performance by reducing a flame temperature by increasing a gas recirculation flow.

Another objective of the embodiments is to provide a combustor for achieving low emission combustion by performing moderate or intense low-oxygen dilution (MILD) combustion.

Technical Solution

A combustor according to an embodiment may include: a combustion tube having a cylindrical shape with a combustion space where fuel is combusted, and including an inlet through which the fuel is introduced, an outlet through which a gas generated when the fuel is combusted is discharged, and a protrusion protruding inward from a wall surface between the inlet and the outlet; an injection unit configured to inject fuel into the combustion tube through the inlet of the combustion tube; and an additional injection unit located on the protrusion of the combustion tube and configured to inject fuel into the combustion tube.

The protrusion and the additional injection unit may respectively include a plurality of protrusions and a plurality of additional injection units, which are arranged to be spaced apart from one another in a circumferential direction of the combustion tube.

The protrusions and the additional injection units may be symmetric with respect to the center of the combustion tube.

The protrusion may include an outer support wall that protrudes toward the center of the combustion center further than the wall surface of the combustion tube and an inner support wall that protrudes toward the center of the combustion tube further than the outer support wall, the additional injection unit is located on the outer support wall, the inner support wall has a fuel hole that is formed at a position corresponding to the additional injection unit and through which the fuel injected by the additional injection unit passes to the combustion tube and inner air holes that are formed around the fuel hole, and the outer support wall has outer air holes that are formed around the additional injection unit.

Diameters of the outer air holes may be greater than diameters of the inner air holes.

The combustion space of the combustion tube may be divided into a first zone that is an upstream region where the fuel injected by the injection unit is combusted, collides with the fuel injected by the additional injection unit and air injected through the protrusion, and primarily recirculates toward the inlet and a second zone that is a region where the fuel injected by the additional injection unit proceeds to a position downstream of the first zone, is combusted, and secondarily recirculates toward the inlet.

The second zone may be formed about a central axis of the combustion tube in a longitudinal direction of the combustion tube and allows a combustion product generated in the second zone to be delivered to the first zone, and the first zone protrudes further outward than the second zone along the central axis of the combustion tube.

The protrusion may include a first inclined portion that is inclined toward the inlet of the combustion tube with respect to the wall surface of the combustion tube, a second inclined portion that is inclined toward the inlet of the combustion tube with respect to the wall surface of the combustion tube, and a connecting portion that extends parallel to the wall surface, connects the first inclined portion and the second inclined portion, and allows the additional injection unit to be located thereon.

An inclination angle between the first inclined portion and the wall surface may range from about 20° to about 60°.

An inclination angle between the second inclined portion and the wall surface may range from about 10° to about 90°.

A plurality of air holes through which external air is delivered into the combustion tube may be formed in the first inclined portion and the second inclined portion.

The combustor may further include: a preliminary mixing chamber to which the injection unit is coupled and that is located on the inlet; and a swirler provided in the preliminary mixing chamber and configured to supply a flow of air to the preliminary mixing chamber.

Advantageous Effects of the Invention

In a combustor according to the above-described embodiments, since dilution fuel is discharged through an additional injection unit located on a protrusion protruding inward from a wall surface of a combustion tube, an exhaust gas recirculation flow of the combustor may be enhanced. Accordingly, flameless combustion (e.g., moderate or intense low-oxygen dilution (MILD) combustion) may be performed in the combustor and combustion emissions may be greatly reduced.

Also, since the additional injection unit is located on the protrusion of the combustion tube, a path through which a gas of a first zone where primary combustion takes place may flow to a second zone at a downstream portion may be formed, and also the flow of dilution fuel injected by the additional injection unit may collide with the flow of dilution fuel and a gas of a primary recirculation flow zone and may flow to the second zone at the downstream portion. The dilution fuel injected by the additional injection unit may be combusted in the second zone at the downstream portion and then may recirculate toward the first zone at an upstream portion. Accordingly, the combustion and the recirculation flow in the first zone and the combustion and the recirculation flow in the second zone in the combustion tube are enhanced.

BEST MODE

Configurations and operations of combustors according to embodiments will now be explained in detail with reference to the attached drawings. The expression 'and/or' used herein refers to any and all combinations of one or more of associated elements.

Figure 1:
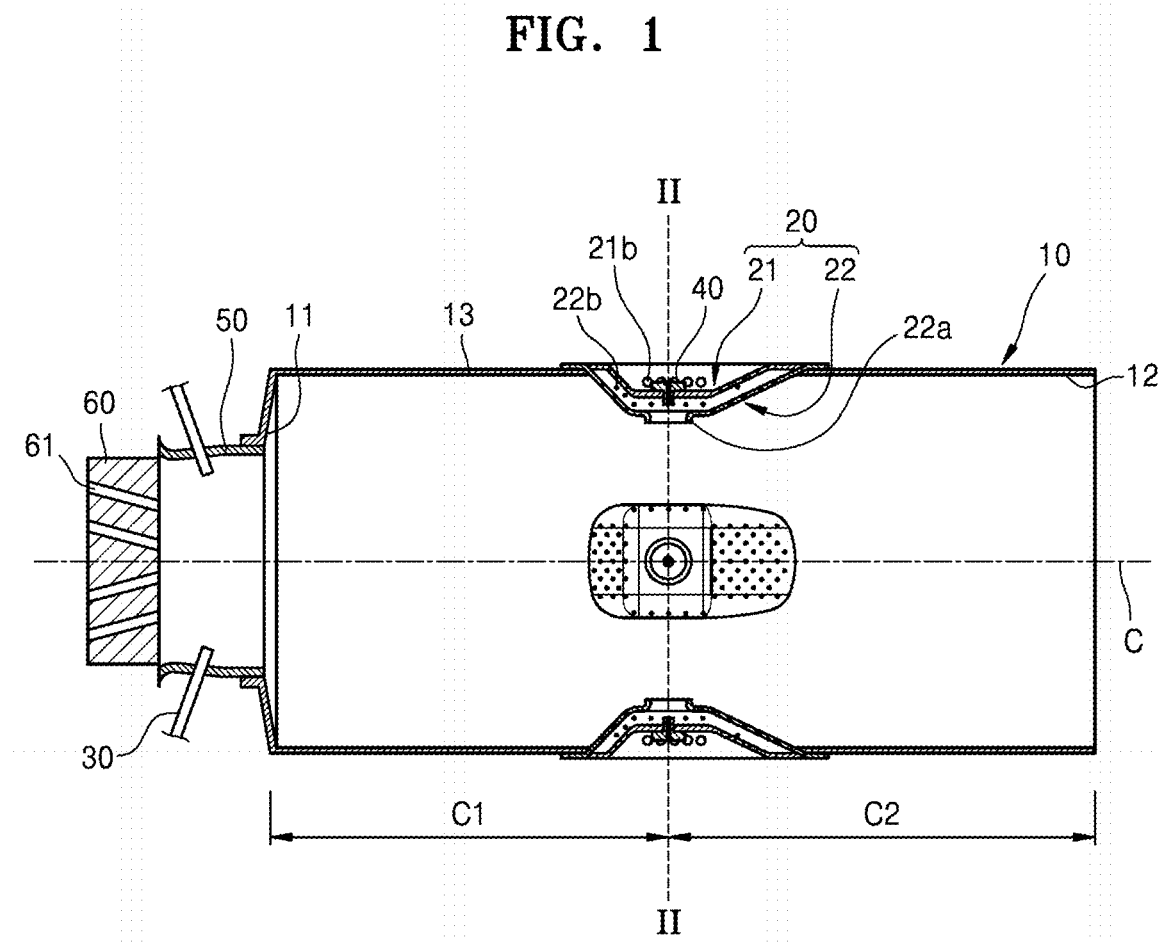
FIG. 1 is a side cross-sectional view schematically illustrating a structure of a combustor according to an embodiment.
Figure 2:
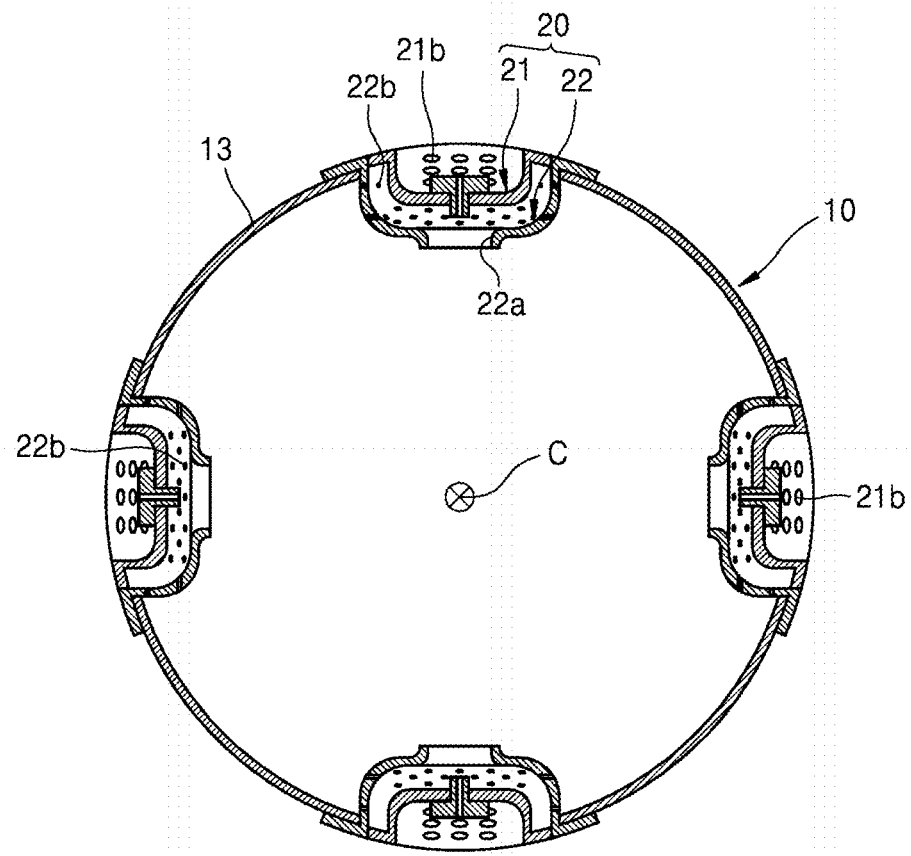
FIG. 2 is a front cross-sectional view taken along line II-II of the combustor of FIG. 1.
Figure 3:
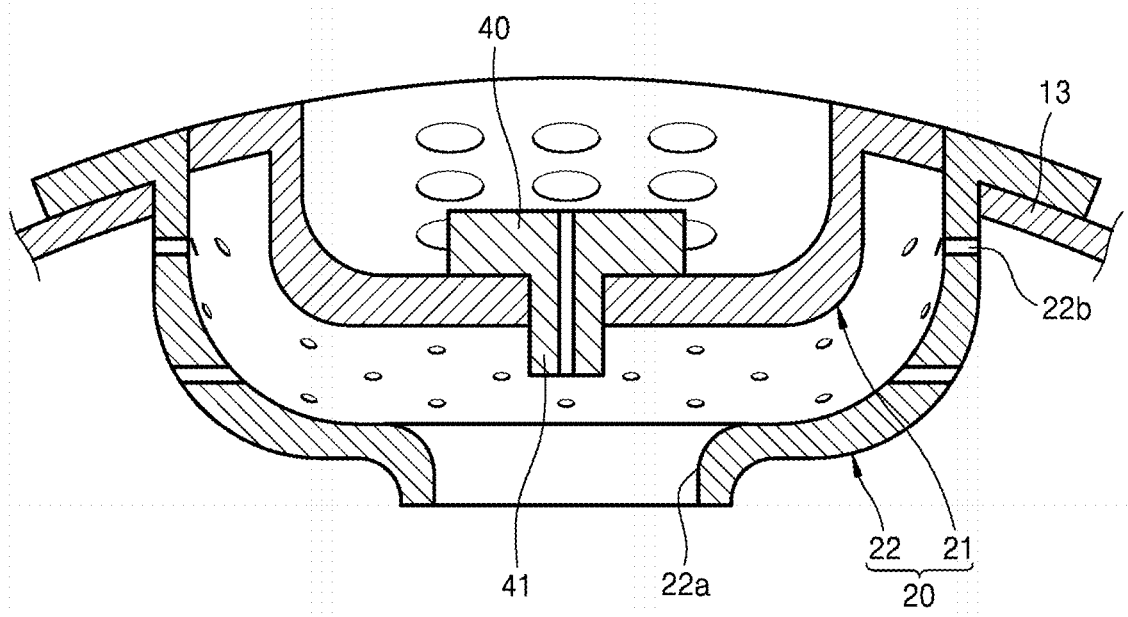
FIG. 3 is an enlarged view illustrating a portion of the combustor of FIG. 2.
Figure 4:
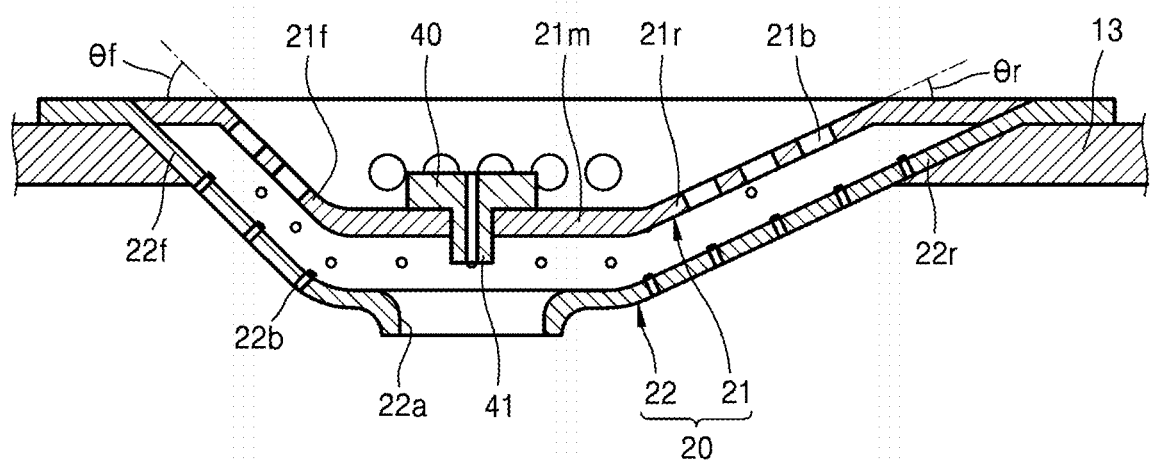
FIG. 4 is an enlarged side view illustrating a portion of the combustor of FIG. 3.

FIG. 1 is a side cross-sectional view schematically illustrating a structure of a combustor according to an embodiment. FIG. 2 is a front cross-sectional view taken along line II-II of the combustor of FIG. 1. FIG. 3 is an enlarged view illustrating a portion of the combustor of FIG. 2. FIG. 4 is an enlarged side view illustrating a portion of the combustor of FIG. 3.

The combustor according to the embodiment of FIGS. 1 through 4 includes a combustion tube 10 manufactured to have a cylindrical shape and having therein a combustion space where fuel is combusted, an injection unit 30 configured to inject fuel into the combustion tube 10 through an inlet 11 of the combustion tube 10, and an additional injection unit 40 located on a protrusion 20 of the combustion tube 10 that is formed further downstream than the inlet 11 of the combustion tube 10 and configured to inject fuel into the combustion tube 10.

The combustion tube 10 is manufactured to have a hollow cylindrical shape with a wall surface 13 and has therein the combustion space where fuel is combusted. Also, the combustion tube 10 includes the inlet 11 that is located on one side of the combustion tube 10 and through which fuel is introduced and the outlet 12 that is located on the other side of the combustion tube 10 and through which a gas generated when the fuel is combusted in the combustion space is discharged.

The combustion tube 10 includes the protrusion 20 protruding inward from a portion of the wall surface 13 between the inlet 11 and the outlet 12. The protrusion 20 is formed further downstream than the inlet 11 when viewed from the flow of fuel introduced into the combustion tube 10 through the inlet 11.

The injection unit 30 for injecting fuel into the combustion tube 10 is provided on the inlet 11 located on one side of the combustion tube 10. A preliminary mixing chamber 50 is provided on the inlet 11 of the combustion tube 10 and the injection unit 30 is provided in the preliminary mixing chamber 50. Also, a swirler 60 for delivering a flow of air to the inlet 11 of the combustion tube 10 is provided in the preliminary mixing chamber 50. The swirler 60 includes an air path 61 through which air is introduced. Positions and structures of the preliminary mixing chamber 50, the swirler 60, and the injection unit 30 are not limited thereto, and may be modified in various ways to inject fuel and efficiently mix the fuel with air.

The additional injection unit 40 for injecting fuel into the combustion tube 10 is provided on the protrusion 20 of the combustion tube 10. The additional injection unit 40 additionally supplies fuel and air into the combustion tube 10 at the downstream side when viewed from the flow of fuel introduced through the inlet 11 of the combustion tube 10.

Referring to FIG. 2, a plurality of the protrusions 20 and the additional injection units 40 are arranged to be spaced apart from one another in a circumferential direction of the combustion tube 10. The protrusions 20 and the additional injection units 40 are symmetric about the center C the combustion tube 10 in a longitudinal direction of the combustion tube 10 of FIG. 2.

In FIG. 2, the protrusion 20 may be formed so that the area of a circular portion that connects ends of the protrusion 20 toward the center C of the combustion tube 10 is about 85% of the area of a circular portion that connects inner circumferential surfaces of the wall surface 13 of the combustion tube 10.

Although four protrusions 20 and four additional injection units 40 are illustrated in FIG. 2, the embodiment is not limited by the number of the protrusions 20 and the additional injection units 40. That is, an even number of protrusions 20 and additional injection units 40 (e.g., 4, 6, or 8 protrusions 20 and additional injection units 40) or an odd number of protrusions 20 and additional injection units 40 (e.g., 3, 5, or 7 protrusions 20 and additional injection units 40) may be arranged to be symmetric.

The protrusion 20 includes an outer support wall 21 that protrudes toward the center C of the combustion tube 10 further than the inner surface of the wall surface 13 of the combustion tube 10, and an inner support wall 22 that protrudes toward the center C of the combustion tube 10 further than the outer support wall 21. Since the outer support wall 21 and the inner support wall 22 are spaced apart from each other, a space where a path of external air is formed is formed between the outer support wall 21 and the inner support wall 22. Due to such a double structure of the outer support wall 21 and the inner support wall 22, the protrusions 20 may enable the external air to be smoothly introduced into the combustion tube 10.

The additional injection unit 40 is located on the outer support wall 21. The outer support wall 21 has outer air holes 21b formed around the additional injection unit 40. The outer air holes 21b allow external air of the combustion tube 10 to be introduced into the space between the outer support wall 21 and the inner support wall 22.

The inner support wall 22 has a fuel hole 22a through which fuel injected by a fuel nozzle 41 of the additional injection unit 40 passes and inner air holes 22b formed around the fuel hole 22a. The inner air holes 22b discharge part of air, introduced into the space between the inner support wall 22 and the outer support wall 21 through the outer air holes 21b of the outer support wall 21, into the combustion tube 10.

Diameters of the outer air holes 21b of the outer support wall 21 are greater than diameters of the inner air holes 22b of the inner support wall 22.

The fuel hole 22a of the inner support wall 22 functions as a path through which fuel injected by the fuel nozzle 41 of the additional injection unit 40 and external air may be mixed and then may be supplied into the combustion tube 10.

Referring to FIG. 4, the outer support wall 21 includes a first inclined portion 21f that is inclined with respect to the wall surface 13 of the combustion tube 10 toward the inlet 11 of the combustion tube 10, and a second inclined portion 21r that is inclined with respect to the wall surface 13 of the combustion tube 10 toward the outlet 12 of the combustion tube 10. An inclination angle θf between the first inclined portion 21f and the wall surface 13 ranges from about 20° to about 60°. An inclination angle θr between the second inclined portion 21r and the wall surface 13 ranges from about 10° to about 90°.

Also, the first inclined portion 21f and the second inclined portion 21r of the outer support wall 21 are connected by a connecting portion 21m that extends parallel to the wall surface 13. The additional injection unit 40 is located on the connecting portion 21m.

The outer support wall 21 also includes a first inclined portion 22f and a second inclined portion 22r that respectively extend parallel to the first inclined portion 21f and the second inclined portion 21r.

Referring to FIG. 1, the combustion space of the combustion tube 10 is divided into a first zone C1 that is an upstream region where an exhaust gas generated after fuel injected by the injection unit 30 is combusted collides with fuel injected by the additional injection unit 40 and air introduced through the protrusion 20 to primarily recirculate toward the inlet 11, and a second zone C2 that is located downstream of the first zone C1.

The second zone C2 is a region where an exhaust gas generated after the fuel injected by the additional injection unit 40 proceeds to a position further downstream than the first zone C1 and is combusted secondarily recirculates toward the inlet 11.

Figure 5:
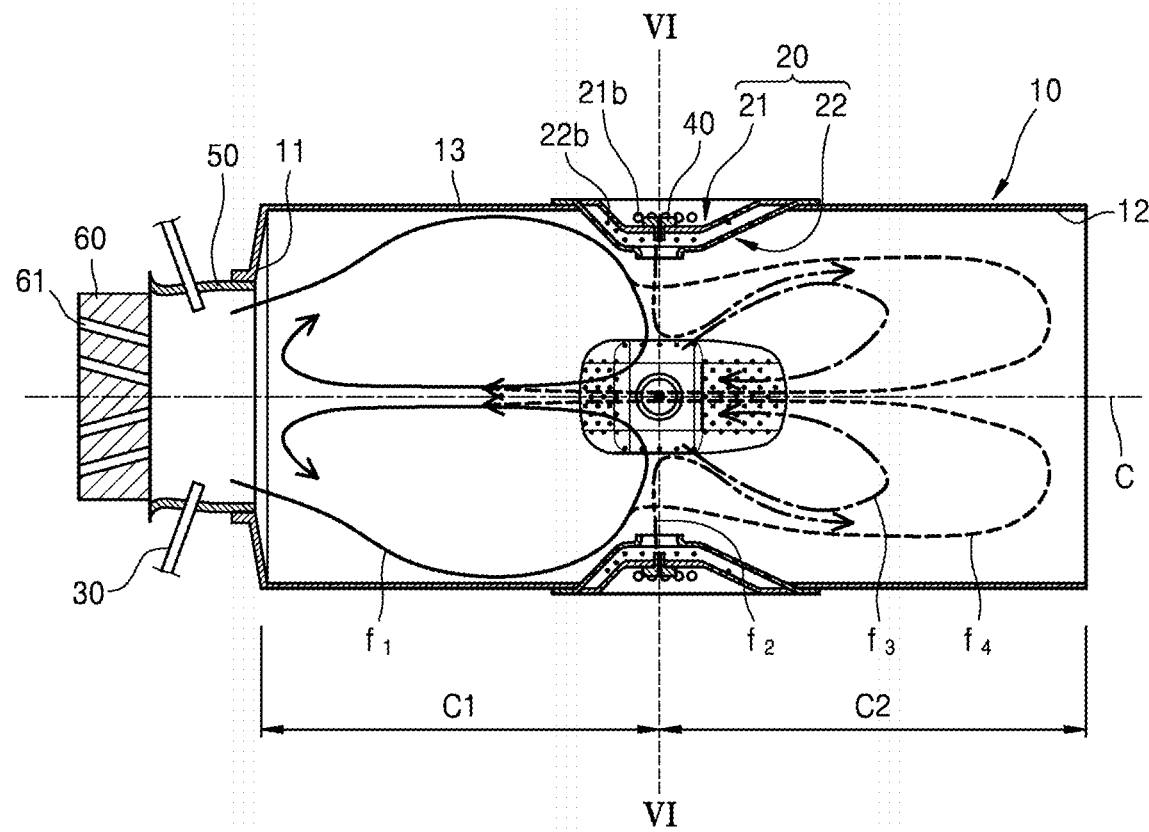
FIG. 5 is a view for explaining the flow of a fluid due to combustion occurring in the combustor of FIG. 1.
Figure 6:
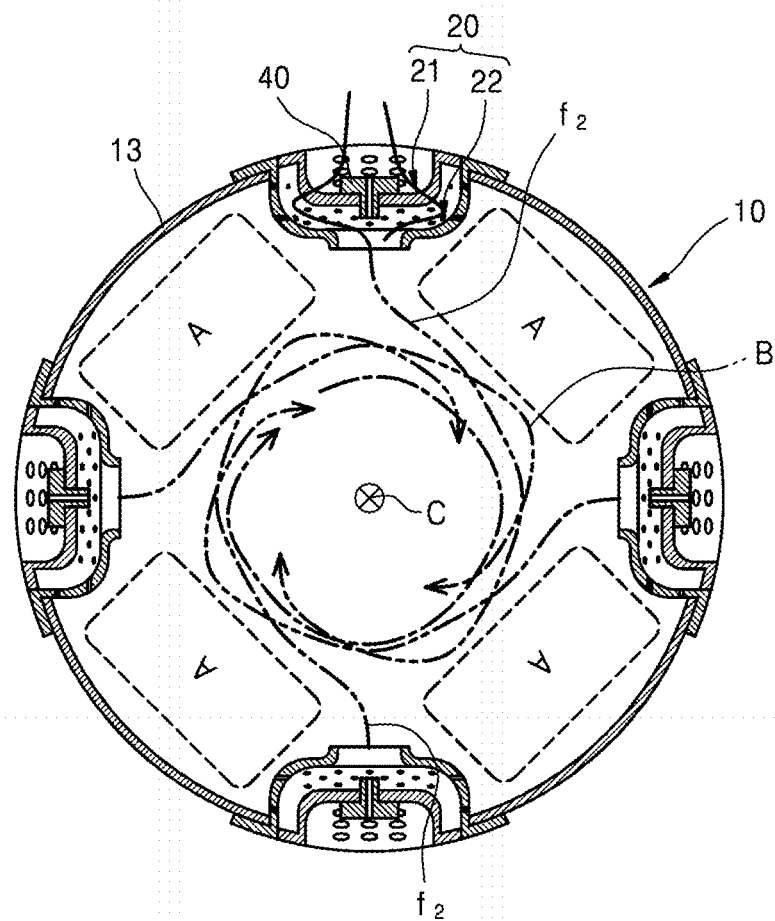
FIG. 6 is a cross-sectional view taken along line VI-VI of FIG. 5, for explaining the flow of a fluid due to combustion of the combustor.

FIG. 5 is a view for explaining the flow of a fluid due to combustion occurring in the combustor of FIG. 1. FIG. 6 is a cross-sectional view taken along line VI-VI of FIG. 5, for explaining the flow of a fluid due to combustion of the combustor.

Combustion of fuel injected by the injection unit 30 takes place in the first zone C1. Also, in the first zone C1, an exhaust gas generated when the fuel injected by the injection unit 30 is combusted collides with the fuel injected by the additional injection unit 40 and air introduced through the protrusions 20 and recirculates toward the inlet 11.

FIG. 5 illustrate a first recirculation flow $f_1$ of an exhaust gas generated when fuel injected by the injection unit 30 is combusted and a dilution fuel flow $f_2$ of the fuel injected by the additional injection unit 40 and the air introduced through the protrusion 20, in the first zone C1. Also, FIG. 5 illustrates a second recirculation flow $f_3$ of an exhaust gas generated when the fuel injected by the additional injection unit 40 is combusted and a third recirculation flow $f_4$ of part of exhaust gas introduced from the first zone C1 to the second zone C2 and recirculating toward the first zone C1 again, in the second zone C2.

Referring to FIG. 6, in a sectional area perpendicular to the longitudinal direction of the combustion tube 10, a region A of the combustion tube 10 refers to a portion of the combustion tube 10 where the protrusion 20 and the additional injection unit 40 are not provided. The region A provides a path from the first zone C1 to the second zone C2 of FIG. 5 so that an enhanced recirculation flow may be formed in the combustion tube 10.

In the area perpendicular to the longitudinal direction of the combustion tube 10, a region B of the combustion tube 10 provides a path through which dilution fuel obtained by mixing the fuel injected by the additional injection unit 40 and the air introduced through the protrusion 20 collides with a flow of an exhaust gas of the first zone C1 and a combustion byproduct generated by the additional injection unit 40 is delivered to the first zone C1. Hence, the region A functions as an exit of a recirculation flow, and the region B functions as an entrance through which a combustion product is introduced into the first zone C1.

MODE OF INVENTION

Figure 7:
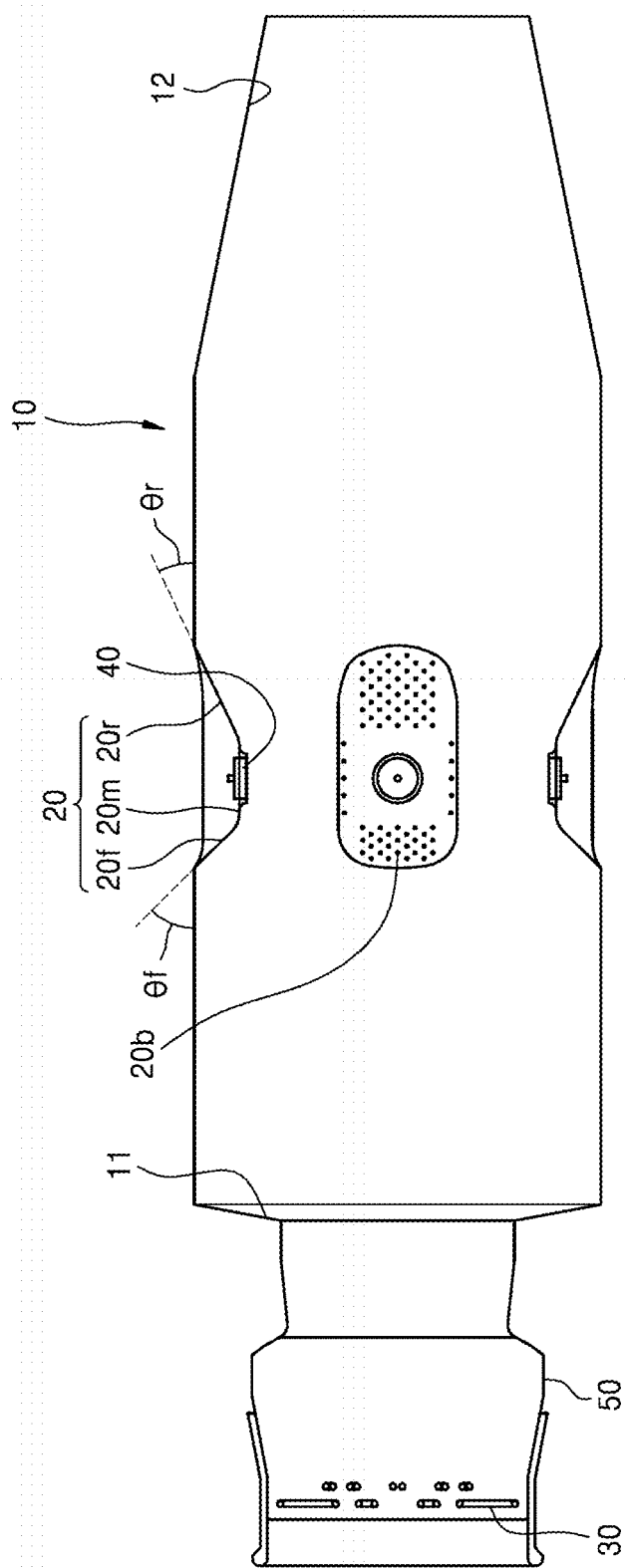
FIG. 7 is a side view schematically illustrating a structure of a combustor according to another embodiment.

FIG. 7 is a side view schematically illustrating a structure of a combustor according to another embodiment.

The combustor according to the embodiment of FIG. 7 was designed for comparison with a structure of a typical combustor, and a structure of the protrusion 20 was modified from a structure of the protrusion 20 of the combustor of the embodiment of FIGS. 1 through 6. The protrusion 20 of the combustor of the embodiment of FIGS. 1 through 6 has a two-layer structure whereas the protrusion 20 of FIG. 7 has a one-layer structure.

The combustor of the embodiment of FIG. 7 includes the combustion tube 10 manufactured to have a cylindrical shape and having therein a combustion space where fuel is combusted, the injection unit 30 configured to inject fuel into the combustion tube 10 through the inlet 11 of the combustion tube 10, and the additional injection unit 40 located on the protrusion 20 of the combustion tube 10 that is formed further downstream than the inlet 11 of the combustion tube 10 and configured to inject fuel into the combustion tube 10.

The preliminary mixing chamber 50 is provided on the inlet 11 of the combustion tube 10. When fuel is injected by the injection unit 30 provided in the preliminary mixing chamber 50, the fuel is introduced into the combustion tube 10 through the inlet 11 of the combustion tube 10 and is combusted. The combustion tube 10 includes the protrusion 20 protruding inward from a portion of the wall surface 13 between the inlet 11 and the outlet 12. The protrusion 20 is formed further downstream than the inlet 11 when viewed from the flow of fuel introduced into the combustion tube 10 through the inlet 11.

The protrusion 20 includes the first inclined portion 21$f$ that is inclined toward the inlet 11 of the combustion tube 10 with respect to the wall surface 13 of the combustion tube 10, the second inclined portion 21$r$ that is inclined toward the outlet 12 of the combustion tube 10 with respect to the wall surface 13 of the combustion tube 10, and the connecting portion 21$m$ that connects the first inclined portion 21$f$ and the second inclined portion 21$r$ and on which the additional injection unit 40 is located.

The inclination angle θf between the first inclined portion 21$f$ and the wall surface 13 ranges from about 20° to about 60°. The inclination angle θr between the second inclined portion 21$r$ and the wall surface 13 ranges from about 10° to about 90°.

The protrusion 20 has a plurality of air holes 20$b$ through which external air of the combustion tube 10 is introduced into the combustion tube 10.

Figure 8:
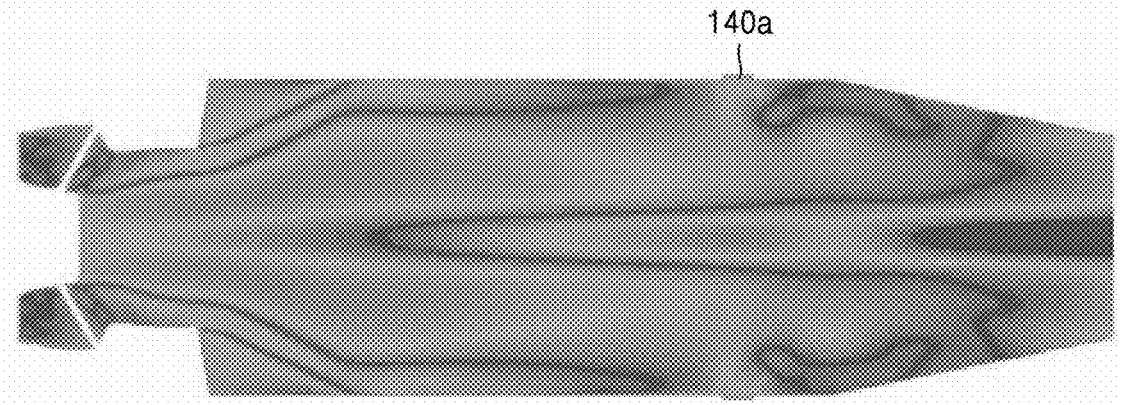
FIG. 8 is a distribution view illustrating a distribution of the flow of a combustion gas of Comparative Example 1 in which a dilution fuel injector is provided on a downstream wall surface of a standard can-type combustor.

FIG. 8 is a distribution view illustrating a distribution of the flow of a combustion gas of Comparative Example 1 in which a dilution fuel injector is provided on a downstream wall surface of a standard can-type combustor.

The standard can-type combustor of Comparative Example 1 of FIG. 8 was designed to be the same as a structure of the combustion tube 10 of FIG. 7, and a dilution fuel injector 140$a$ was provided on the downstream wall surface of the standard can-type combustor.

Figure 9:
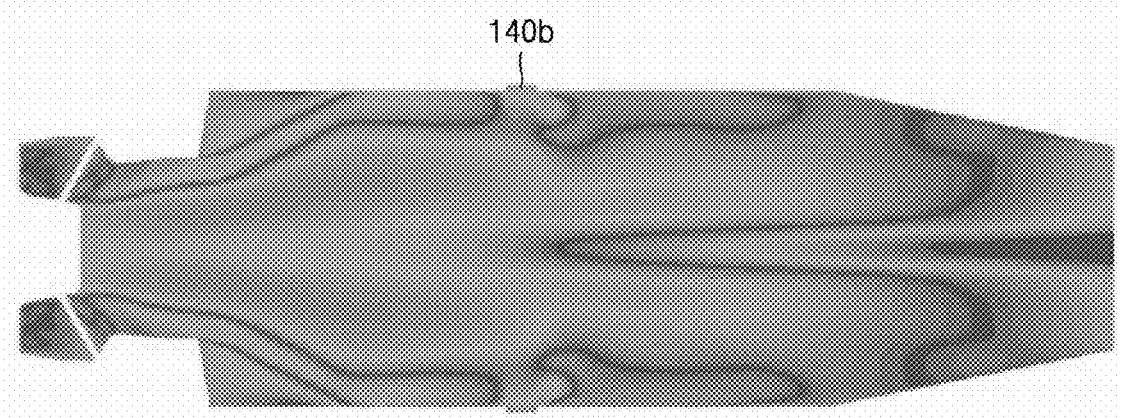
FIG. 9 is a distribution view illustrating a distribution of the flow of combustion gas of Comparative Example 2 in which a dilution fuel injector is provided on an upstream wall surface of the standard can-type combustor.

FIG. 9 is a distribution view illustrating a distribution of the flow of a combustion gas of Comparative Example 2 in which a dilution fuel injector is provided on an upstream wall surface of the standard can-type combustor.

The standard can-type combustor of Comparative Example 2 of FIG. 9 was designed to be the same as a structure of the combustion tube 10 of FIG. 7, and a dilution fuel injector 140$b$ was provided on a wall surface of the standard can-type combustor that was further upstream than that of the dilution fuel injector 140$a$ of the standard can-type combustor of Comparative Example 1 of FIG. 8.

Figure 10:
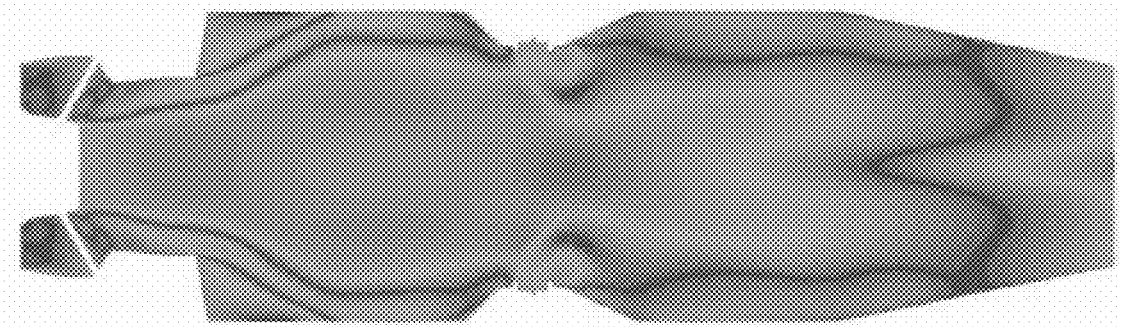
FIG. 10 is a distribution view illustrating a distribution of the flow of a combustion gas of the combustor of FIG. 7.

FIG. 10 is a distribution view illustrating a distribution of the flow of a combustion gas of the combustor of FIG. 7. FIG. 10 illustrates a result obtained after an experiment was performed on the combustor of FIG. 7 under the same condition as that of Comparative Example 1 of FIG. 8 and Comparative Example 2 of FIG. 9. The same swirler structure was applied to FIGS. 8, 9, and 10.

FIG. 8 illustrates that only a primary recirculation flow zone was formed in an inner space of the combustor. FIG. 9 illustrates that fuel injected by the dilution fuel injector 140$b$ collided with a primary recirculation flow and a very weak secondary recirculation flow was formed because the dilution fuel injector 140*b* was provided further upstream than that of Comparative Example 1 of FIG. 8.

FIG. 10 illustrates that fuel injected by the additional injection unit 40 located on the protrusion 20 of FIG. 7 collided with a primary recirculation flow and a strong secondary recirculation flow zone was formed, and thus the fuel injected by the additional injection unit 40 was introduced into the secondary recirculation flow zone. As such, enhanced combustion gas recirculation was performed in the combustor of the embodiment of FIG. 7.

Figure 11:
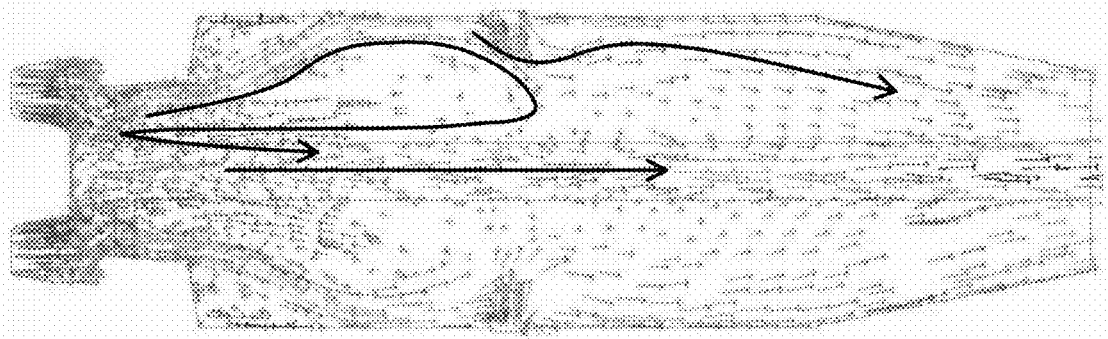
FIG. 11 is a view illustrating the flow of a combustion gas of Comparative Example 2 of FIG. 9 with an arrow.
Figure 12:
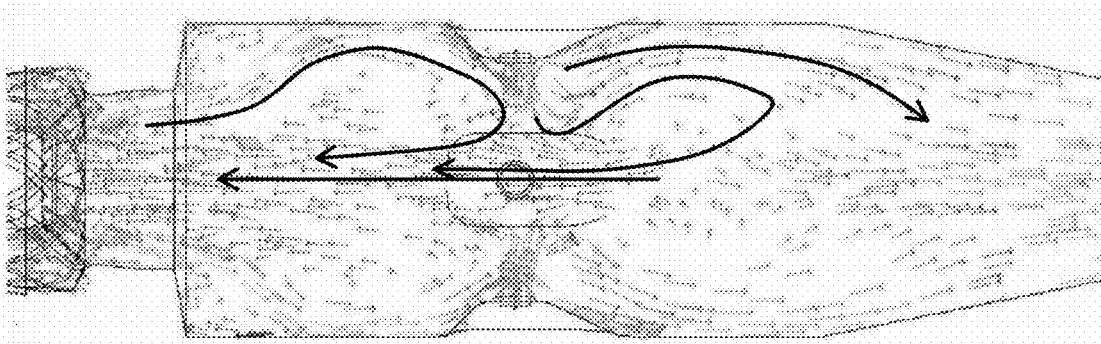
FIG. 12 is a view illustrating the flow of a combustion gas in a region including an additional injection unit of the combustor of FIG. 7 with an arrow.
Figure 13:
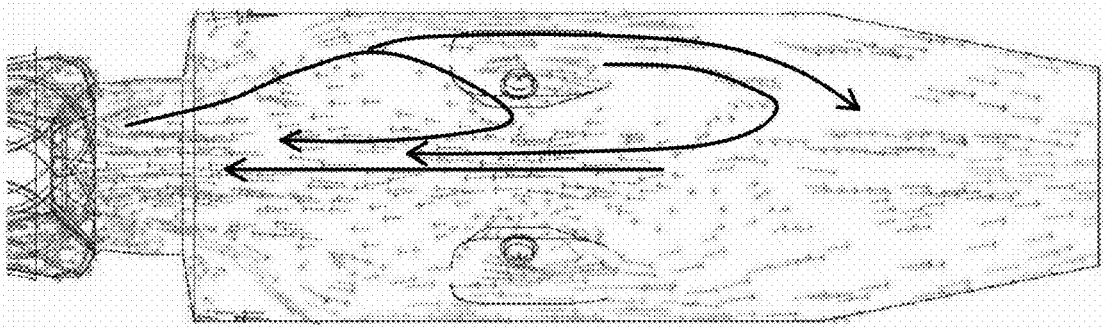
FIG. 13 is a view illustrating the flow of a combustion gas in a region not including the additional injection unit of the combustor of FIG. 7 with an arrow.

FIG. 11 is a view illustrating the flow of a combustion gas of Comparative Example 2 of FIG. 9 with an arrow. FIG. 12 is a view illustrating the flow of a combustion gas in a region including the additional injection unit 40 of the combustor of FIG. 7 with an arrow. FIG. 13 is a view illustrating the flow of a combustion gas in a region not including the additional injection unit 40 of the combustor of FIG. 7 with an arrow.

Referring to FIGS. 11 through 13, since the flow of a combustion gas in each of the combustor of FIG. 7 and the combustor of Comparative Example 2 of FIG. 9 is illustrated with an arrow, an overall recirculation flow may be analyzed in detail.

Referring to FIG. 11, most of an exhaust gas generated by combustion of fuel injected through an inlet of the combustor is discharged toward an outlet along the central axis in a longitudinal direction of the combustor. Also, although a weak recirculation flow is formed due to fuel injection of a dilution fuel injector provided on a wall surface of the combustor, most of the exhaust gas is discharged toward the outlet along the wall surface of the combustor. Accordingly, it is found in Comparative Example 1 that a recirculation flow of an exhaust gas by the dilution fuel injector provided on the wall surface of the combustor is not greatly enhanced.

FIG. 12 is a cross-sectional view illustrating the flow of a combustion gas in a region where the additional injection unit 40 is provided. FIG. 13 illustrates the flow of a combustion gas in a region where the additional injection unit 40 is not provided, that is, in a space between the additional injection units 40.

Referring to FIGS. 12 and 13, since fuel injected by the additional injection unit 40 collides with a primary recirculation flow and a strong secondary recirculation flow zone is formed, a strong flow in which the fuel injected by the additional injection unit 40 is introduced into the secondary recirculation flow zone is formed. Referring to FIG. 13, a flow in which a part of an exhaust gas flows toward an outlet along a wall surface of the combustor in a region where the additional injection unit 40 is not provided, that is, in a space between the additional injection units 40 is formed.

Figure 14:
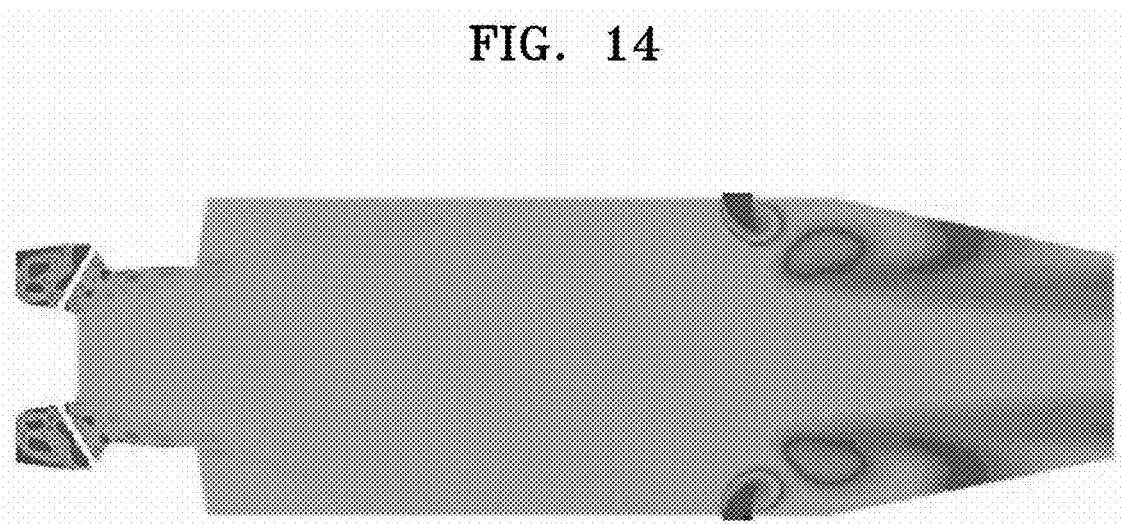
FIG. 14 illustrates a distribution of a mixing ratio between fuel and air injected by the combustor of Comparative Example 1 of FIG. 8.
Figure 15:
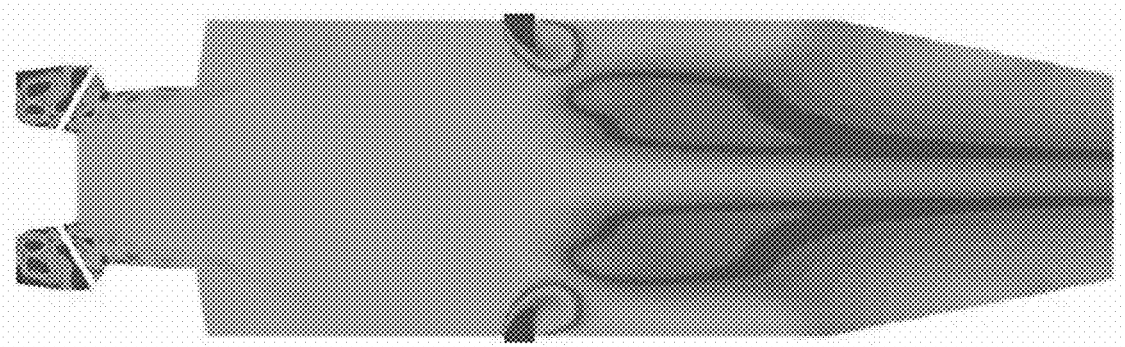
FIG. 15 illustrates a distribution of a mixing ratio between fuel and air injected by the combustor of Comparative Example 2 of FIG. 9.
Figure 16:
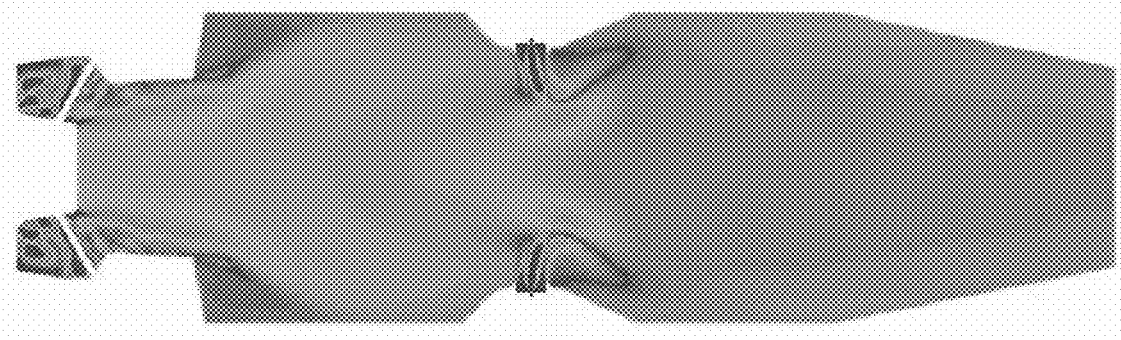
FIG. 16 illustrates a distribution of a mixing ratio between fuel and air injected by the combustor of FIG. 7.

FIG. 14 illustrates a distribution of a mixing ratio between fuel and air injected by the combustor of Comparative Example 1 of FIG. 8. FIG. 15 illustrates a distribution of a mixing ratio between fuel and air injected by the combustor of Comparative Example 2 of FIG. 9. FIG. 16 illustrates a distribution of a mixing ratio of fuel and air injected by the combustor of FIG. 7.

In each of Comparative Example 1 and Comparative Example 2, a mixing ratio between fuel and air before dilution fuel is injected is good.

Referring to FIG. 16, some portions where a dilution fuel concentration is locally high exist in an inner space of the combustor of FIG. 7. The reason why the dilution fuel concentration is locally high is that a large amount of exhaust gas recirculation or flameless oxidation (FLOX) may be achieved by generating localized hot spots and maintaining combustion.

Figure 17:
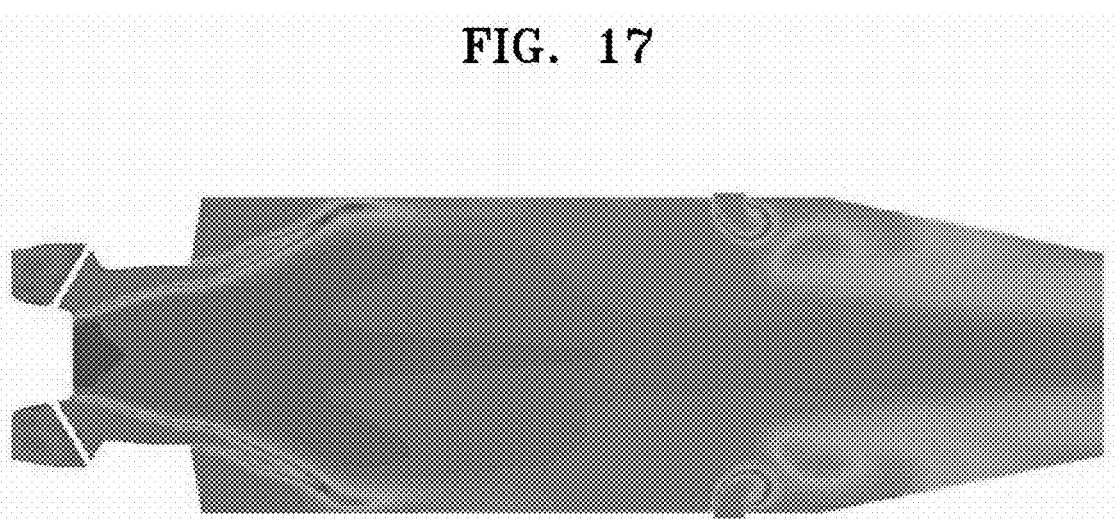
FIG. 17 is a distribution view illustrating a temperature distribution of the combustor of Comparative Example 1 of FIG. 8.
Figure 18:
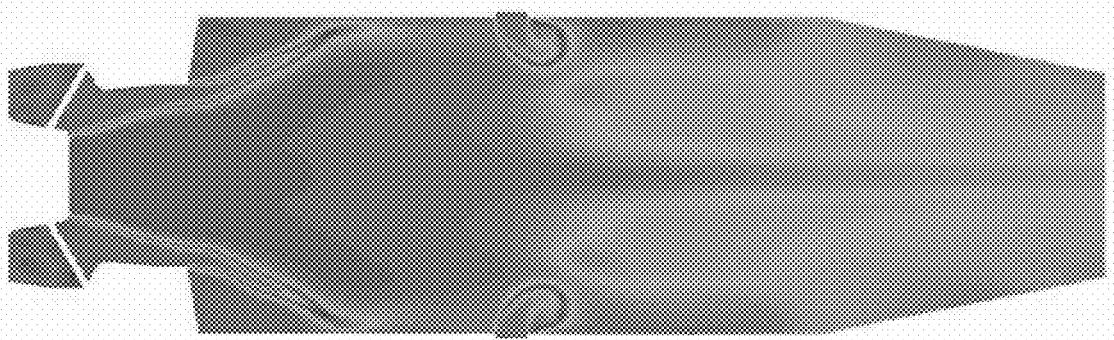
FIG. 18 is a distribution view illustrating a temperature distribution of the combustor of Comparative Example 2 of FIG. 9.

FIG. 17 is a distribution view illustrating a temperature distribution of the combustor of Comparative Example 1 of FIG. 8. FIG. 18 is a distribution view illustrating a temperature distribution of the combustor of Comparative Example 2 of FIG. 9.

In the combustors of Comparative Example 1 of FIG. 17 and Comparative Example 2 of FIG. 18, a similar temperature distribution in a primary combustion zone is observed. Since mixing effect is generated at a downstream portion by moving a dilution fuel inject to an upstream position, a better outlet temperature distribution may be obtained. In Comparative Example 1, a higher temperature distribution is observed at a middle portion of the combustor and a core portion of the outlet. In Comparative Example 2, a lower temperature distribution is observed at a middle portion of the combustor or a core portion of the outlet. Accordingly, it is found that a temperature distribution is greatly changed by changing a position of a dilution fuel injector.

Figure 19:
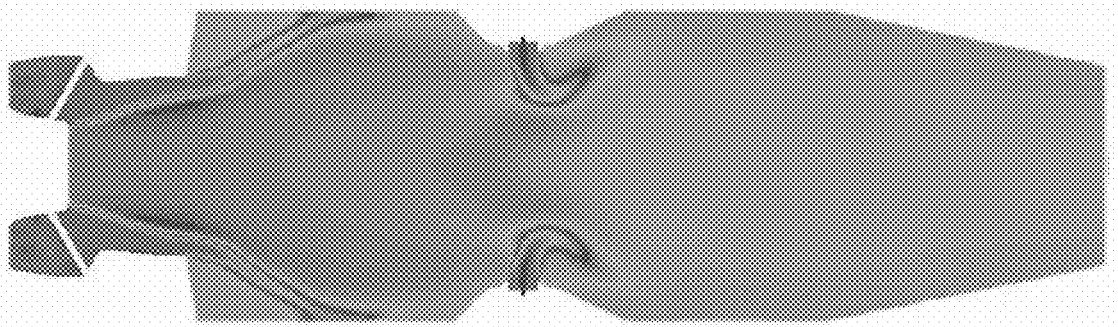
FIG. 19 is a distribution view illustrating a temperature distribution of the combustor of FIG. 7.

FIG. 19 is a distribution view illustrating a temperature distribution of the combustor of FIG. 7.

It is found in the combustor of FIG. 7 that localized hot spots exist in a primary combustion zone and an overall temperature is further reduced.

When a pattern factor of a temperature distribution was analyzed by using computational fluid dynamics (CFD) analysis, the combustor of Comparative Example 1 obtained 0.234, the combustor of Comparative Example 2 obtained 0.162, and the combustor of FIG. 7 obtained 0.027. The pattern factor is defined as $(T_{max}-T_{mean})/(T_{mean}-T_{inlet})$.

$T_{max}$ is a highest temperature, $T_{mean}$ is a mean temperature, and $T_{inlet}$ is an inlet temperature.

Figure 20:
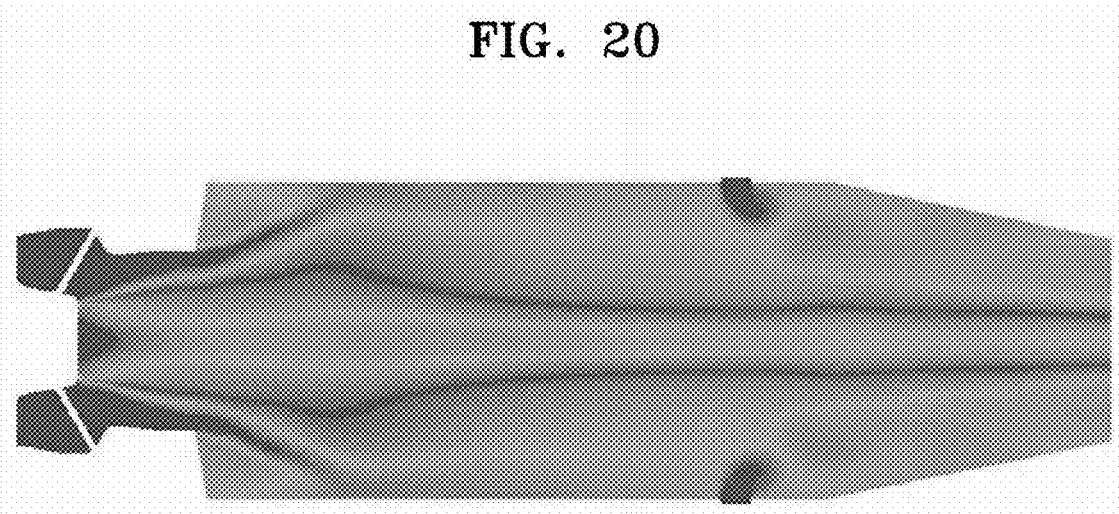
FIG. 20 is a distribution view illustrating a distribution of nitrogen oxide of the combustor of Comparative Example 1 of FIG. 8.
Figure 21:
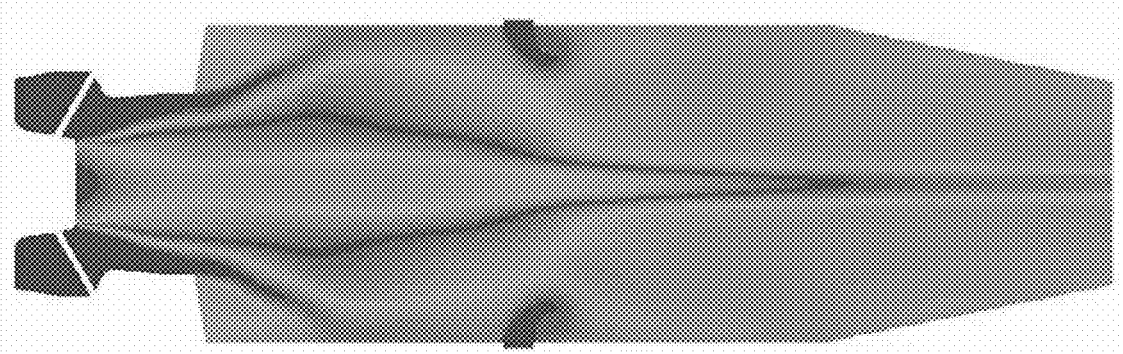
FIG. 21 is a distribution view illustrating a distribution of nitrogen oxide of the combustor of Comparative Example 2 of FIG. 9.
Figure 22:
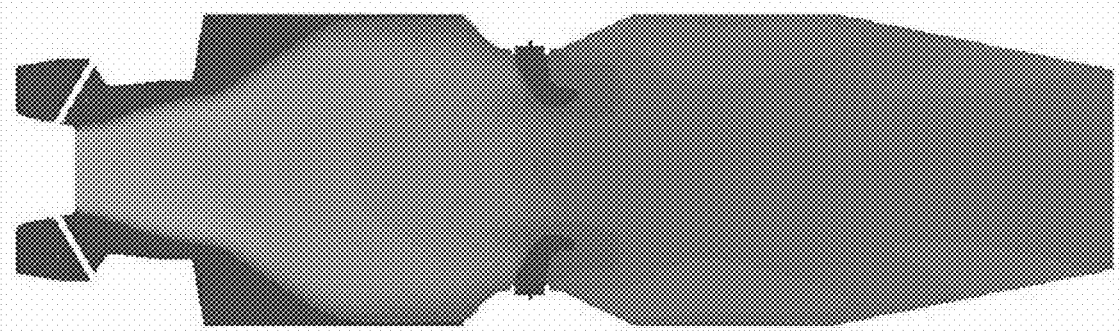
FIG. 22 is a distribution view illustrating a distribution of nitrogen oxide of the combustor of FIG. 7.

FIG. 20 is a distribution view illustrating a distribution of nitrogen oxide of the combustor of Comparative Example 1 of FIG. 8. FIG. 21 is a distribution view illustrating a distribution of nitrogen oxide of the combustor of Comparative Example 2 of FIG. 9. FIG. 22 is a distribution view illustrating a distribution of nitrogen oxide of the combustor of FIG. 7.

It is found in Comparative Example 1 and Comparative Example 2 that a similar nitrogen oxide distribution is observed. Referring to FIG. 21, it is found that a distribution of nitrogen oxide at a downstream portion of a dilution fuel injector in Comparative Example 2 is slightly enhanced.

Referring to a distribution of nitrogen oxide in the combustor of FIG. 7 illustrated in FIG. 22, it is found that nitrogen oxide in the combustor is distributed at a very low level.

Figure 23:
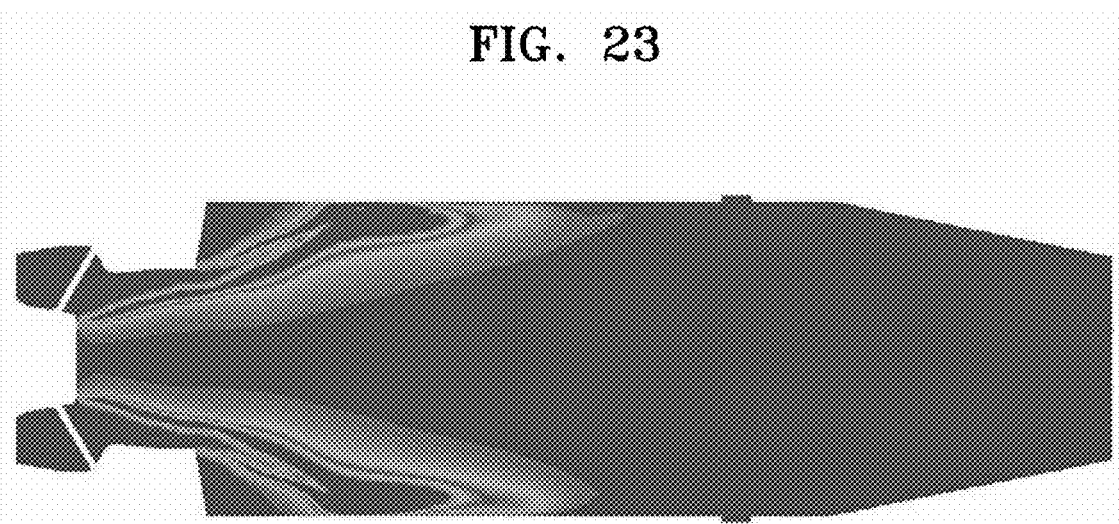
FIG. 23 is a distribution view illustrating a distribution of carbon monoxide of the combustor of Comparative Example 1 of FIG. 8.
Figure 24:
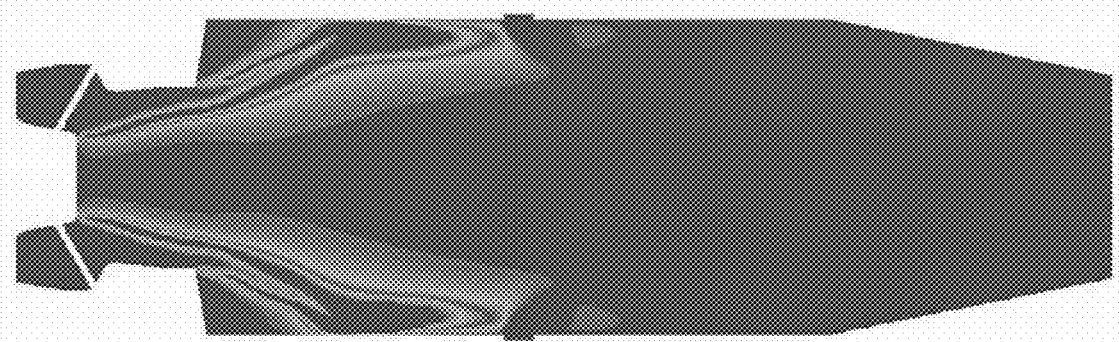
FIG. 24 is a distribution view illustrating a distribution of carbon monoxide of the combustor of Comparative Example 2 of FIG. 9.
Figure 25:
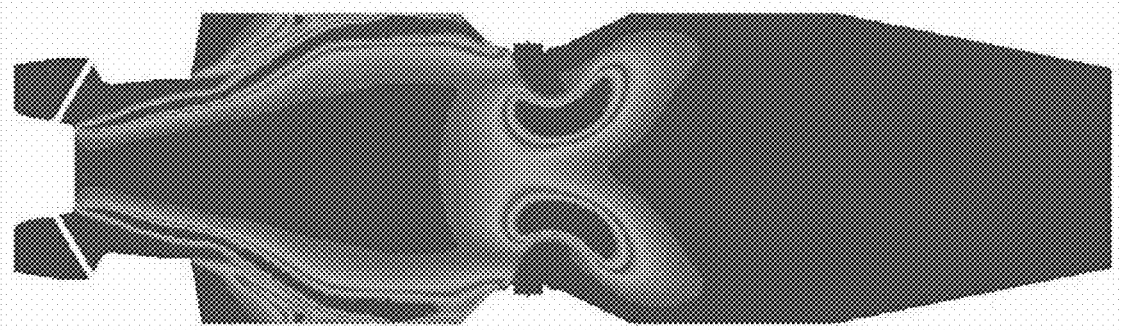
FIG. 25 is a distribution view illustrating a distribution of carbon monoxide of the combustor of FIG. 7.

FIG. 23 is a distribution view illustrating a distribution of carbon monoxide of the combustor of Comparative Example 1 of FIG. 8. FIG. 24 is a distribution view illustrating a distribution of carbon monoxide of the combustor of Comparative Example 2 of FIG. 9. FIG. 25 is a distribution view illustrating a distribution of carbon monoxide of the combustor of FIG. 7.

It is found in Comparative Example 1 and Comparative Example 2 that a similar carbon monoxide distribution is observed. Referring to a distribution of carbon monoxide in the combustor of FIG. 7 illustrated in FIG. 25, it is found that a secondary reaction zone (i.e., a secondary combustion zone) is formed in a secondary recirculation zone in the combustor.

Figure 26:
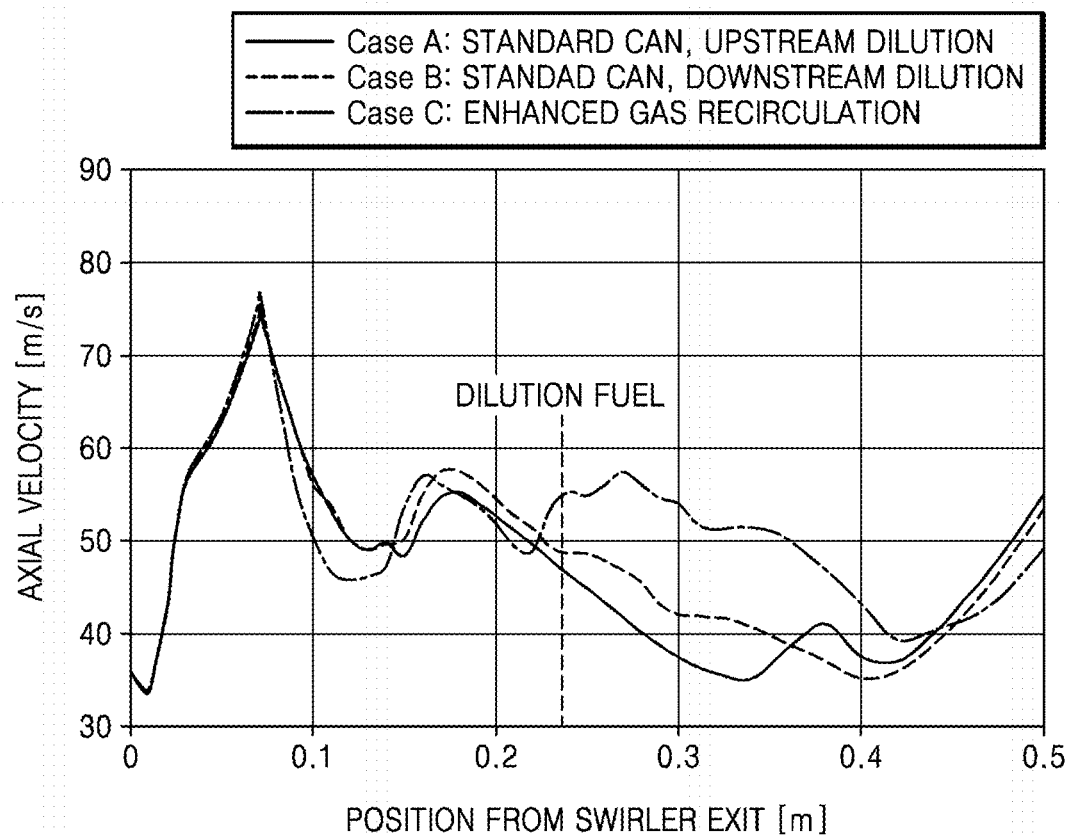
FIG. 26 is a graph illustrating a velocity of the flow of a combustion gas among the combustor of FIG. 7, the combustor of Comparative Example 1 of FIG. 8, and the combustor of Comparative Example 2 of FIG. 9.
Figure 27:
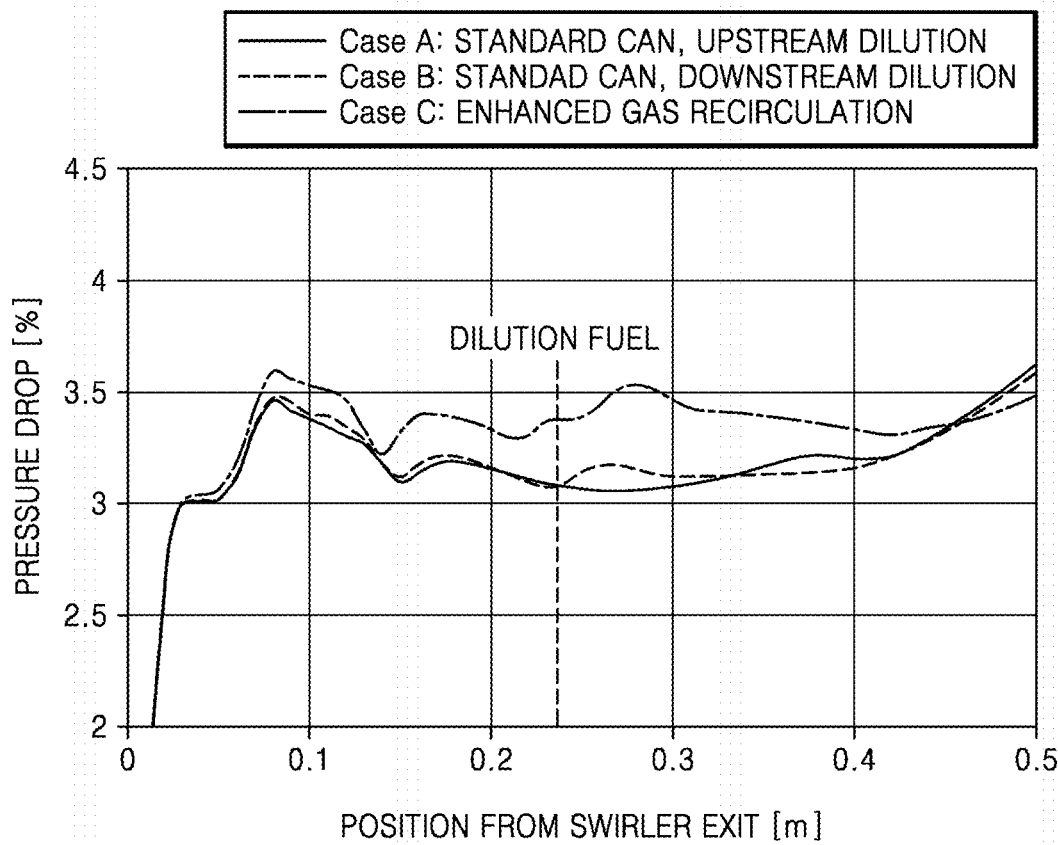
FIG. 27 is a graph illustrating a pressure change among the combustor of FIG. 7, the combustor of Comparative Example 1 of FIG. 8, and the combustor of Comparative Example 2 of FIG. 9.

FIG. 26 is a graph illustrating a velocity of the flow of a combustion gas among the combustor of FIG. 7, the combustor of Comparative Example 1 of FIG. 8, and the combustor of Comparative Example 2 of FIG. 9. FIG. 27 is a graph illustrating a pressure change among the combustor of FIG. 7, the combustor of Comparative Example 1 of FIG.

Figure 28:
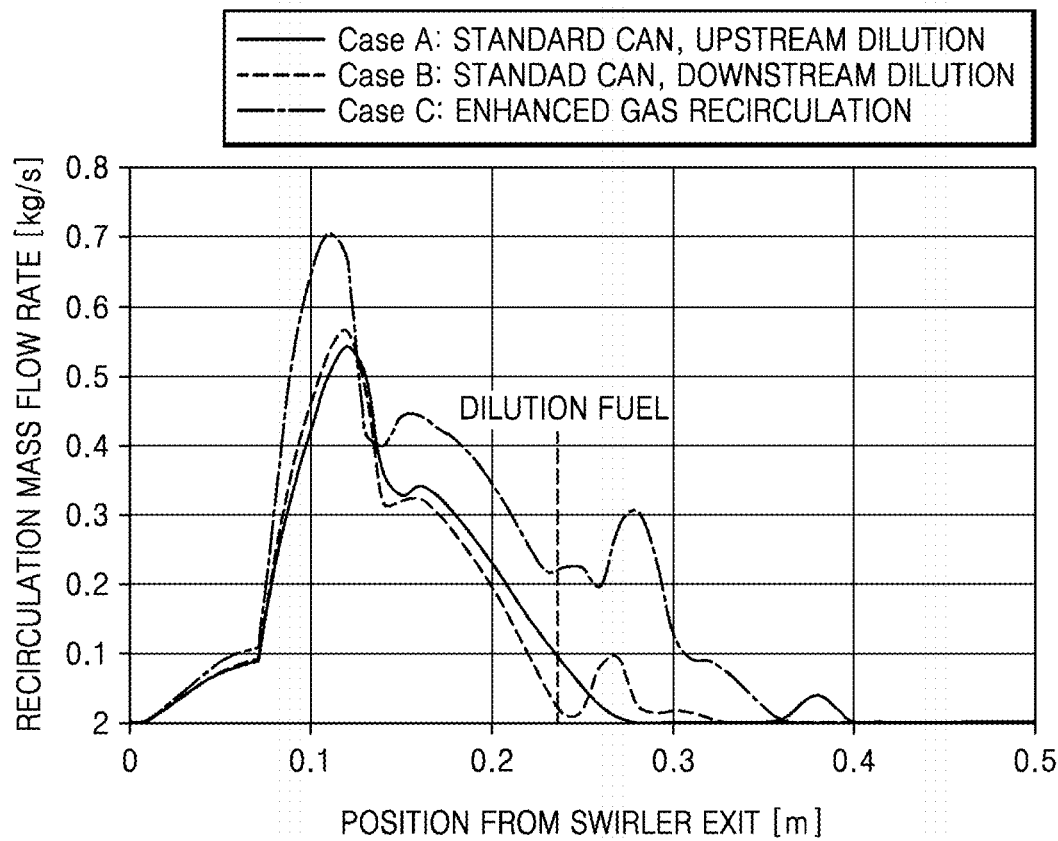
FIG. 28 is a graph illustrating a recirculation flow rate of a combustion gas among the combustor of FIG. 7, the combustor of Comparative Example 1 of FIG. 8, and the combustor of Comparative Example 2 of FIG. 9.

8, and the combustor of Comparative Example 2 of FIG. 9. FIG. 28 is a graph illustrating a recirculation flow rate of a combustion gas among the combustor of FIG. 7, the combustor of Comparative Example 1 of FIG. 8, and the combustor of Comparative Example 2 of FIG. 9.

In the graphs of FIGS. 26 through 28, case A corresponds to the combustor of Comparative Example 1, case B corresponds to the combustor of Comparative Example 2, and case C corresponds to the combustor of FIG. 7.

Referring to FIGS. 26 through 28, Comparative Example 1 and Comparative Example 2 show a similar graph profile.

Referring to FIG. 26, it is found in the combustor of FIG. 7 that an axial velocity is increased after dilution fuel is injected by an additional injection unit.

Referring to FIGS. 26 and 28, it is found in the combustor of FIG. 7 that a mass flow rate of a recirculation flow is increased after dilution fuel is injected by an additional injection unit and an axial velocity is maintained at a high level after the dilution fuel is injected. Accordingly, referring to FIG. 27, it is found in the combustor of FIG. 7 that a pressure drop at a downstream portion is somewhat high.

Figure 29:
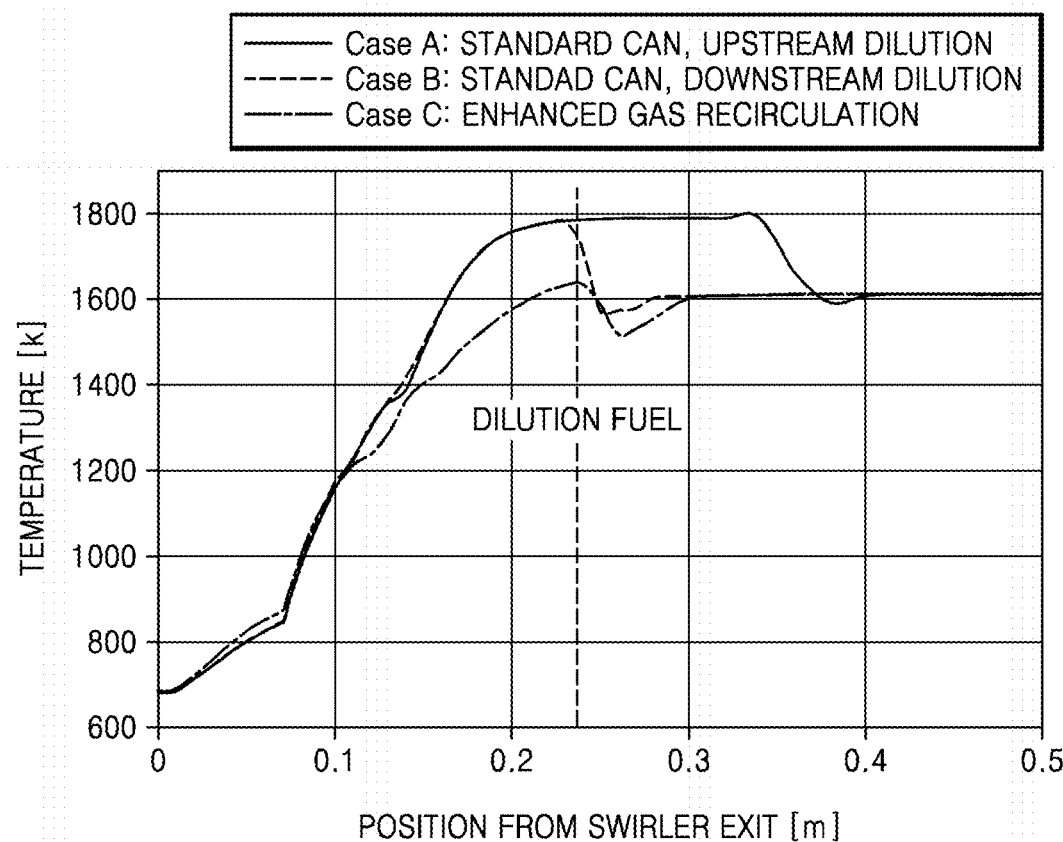
FIG. 29 is a graph illustrating a temperature distribution among the combustor of FIG. 7, the combustor of Comparative Example 1 of FIG. 8, and the combustor of Comparative Example 2 of FIG. 9.
Figure 30:
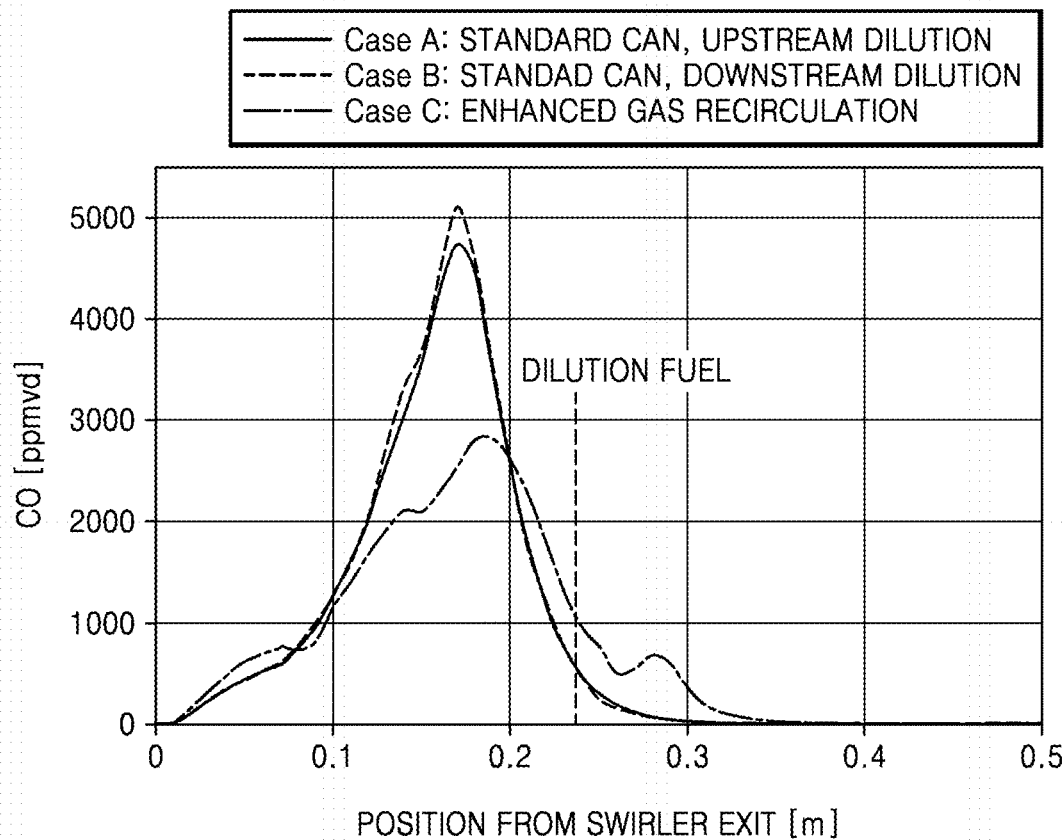
FIG. 30 is a graph illustrating a distribution of carbon monoxide among the combustor of FIG. 7, the combustor of Comparative Example 1 of FIG. 8, and the combustor of Comparative Example 2 of FIG. 9.
Figure 31:
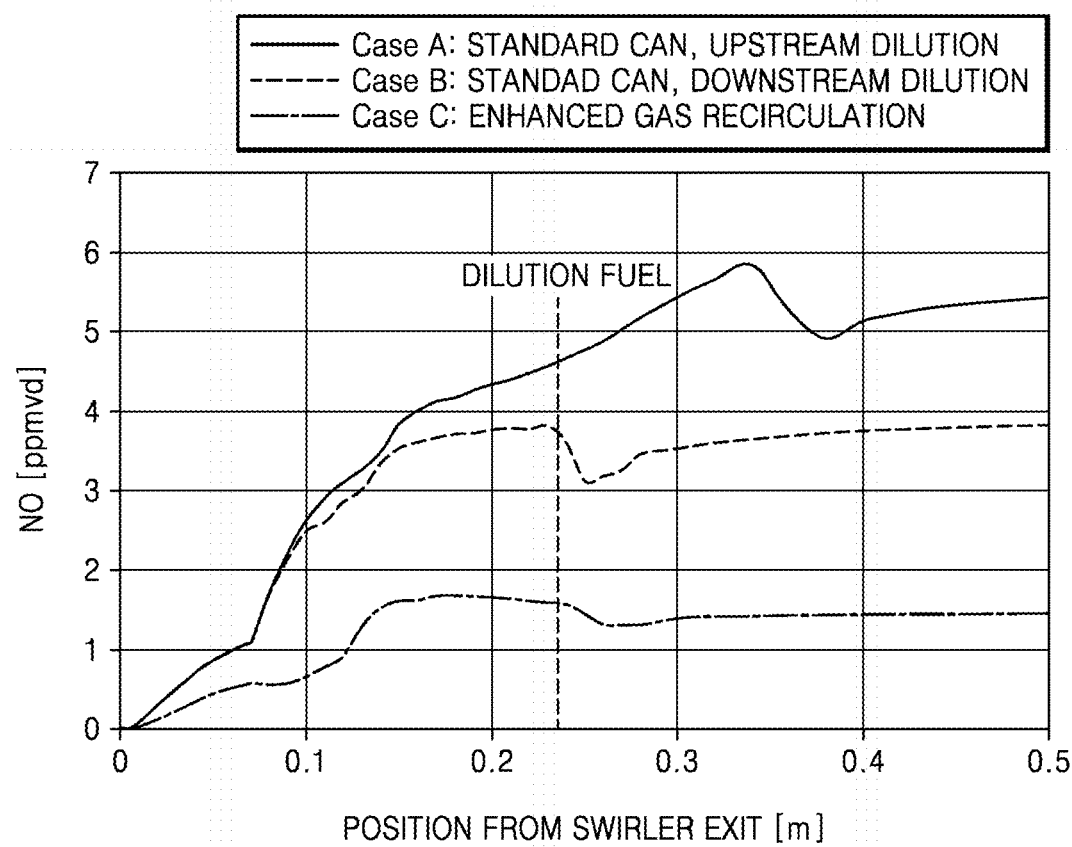
FIG. 31 is a graph illustrating a distribution of nitrogen oxide among the combustor of FIG. 7, the combustor of Comparative Example 1 of FIG. 8, and the combustor of Comparative Example 2 of FIG. 9.

FIG. 29 is a graph illustrating a temperature distribution among the combustor of FIG. 7, the combustor of Comparative Example 1 of FIG. 8, and the combustor of Comparative Example 2 of FIG. 9. FIG. 30 is a graph illustrating a distribution of carbon monoxide among the combustor of FIG. 7, the combustor of Comparative Example 1 of FIG. 8, and the combustor of Comparative Example 2 of FIG. 9. FIG. 31 is a graph illustrating a distribution of nitrogen oxide among the combustor of FIG. 7, the combustor of Comparative Example 1 of FIG. 8, and the combustor of Comparative Example 2 of FIG. 9.

Referring to FIGS. 29 through 31, Comparative Example 1 and Comparative Example 2 show a similar graph profile. Referring to FIG. 31, a nitrogen oxide distribution of Comparative Example 2 is lower than that of Comparative Example 1. However, referring to FIG. 30, Comparative Example 1 and Comparative Example 2 show a similar carbon dioxide distribution.

Referring to FIGS. 30 and 31, it is found in the combustor of FIG. 7 that a nitrogen oxide distribution is greatly enhanced, and although a low carbon monoxide distribution is observed, more time is required to exhaust carbon monoxide.

According to a combustor of the above-described embodiments, since an exhaust gas recirculation flow of the combustor is enhanced, flameless combustion (e.g., MILD combustion) may be performed in the combustor. Accordingly, combustion emissions may be greatly reduced.

Also, since an additional injection unit is located on a protrusion of a combustion tube, a path through which a gas of a first zone where primary combustion takes place may flow to a second zone at a downstream portion may be formed.

Also, since the additional injection unit is located on the protrusion of the combustion tube and injects dilution fuel, the flow of the dilution fuel may collide with the flow of dilution fuel and a gas of a primary recirculation flow zone and may flow to the second zone at the downstream portion.

Also, the dilution fuel injected by the additional injection unit may cause combustion in the second region at the downstream and then may form a recirculation flow toward the first zone at an upstream portion.

While configurations and effects of embodiments have been particularly shown and described, it will be understood by one of ordinary skill in the art that various modifications and equivalent other embodiments may be made from the present invention. Accordingly, the true technical scope of the present invention is defined by the appended claims.

INDUSTRIAL APPLICABILITY

Embodiments relate to a combustor for improving combustion performance and achieving low emission combustion by increasing a gas recirculation flow.

The invention claimed is:
1. A combustor comprising:
a combustion tube including a wall having a cylindrical shape, an interior of the wall forming a combustion space where first and second fuel is combusted, the wall comprising:
an inlet through which the first fuel is introduced;
an outlet through which a gas generated when the first and second fuel is combusted is discharged; and
a protrusion protruding inward in a radial direction of the combustion tube from the wall between the inlet and the outlet in a longitudinal direction of the combustion tube, an outer surface of the protrusion forming an exterior of the combustion tube;
an injector configured to inject the first fuel into the combustion tube through the inlet of the combustion tube; and
an additional injector located on the protrusion of the combustion tube and configured to inject the second fuel into the combustion tube,
wherein the protrusion comprises:
an outer support wall that protrudes in the radial direction toward a central axis of the combustion tube further than a surface of the wall of the combustion tube; and
an inner support wall that protrudes in the radial direction toward the central axis of the combustion tube further than the outer support wall, the additional injector is located on the outer support wall,
wherein the inner support wall comprises a fuel hole that is formed at a position corresponding to the additional injector and through which the second fuel injected by the additional injector passes to the combustion tube and inner air holes that are formed around the fuel hole, and
wherein the outer support wall comprises outer air holes that are formed around the additional injector.

2. The combustor of claim 1, wherein the protrusion and the additional injector respectively comprise a plurality of protrusions and a plurality of additional injectors, which are arranged to be spaced apart from one another in a circumferential direction of the combustion tube.

3. The combustor of claim 2, wherein the plurality of protrusions and the plurality of additional injectors are symmetric with respect to a central axis of the combustion tube.

4. The combustor of claim 1, wherein diameters of the outer air holes are greater than diameters of the inner air holes.

5. The combustor of claim 1, wherein the combustion space of the combustion tube is divided into:
a first zone that is an upstream region where the first fuel injected by the injector is combusted, collides with the second fuel injected by the additional injector and air injected through the protrusion, and primarily recirculates toward the inlet; and
a second zone that is a region where the second fuel injected by the additional injector proceeds to a position downstream of the first zone, is combusted, and secondarily recirculates toward the inlet past the protrusion.

6. The combustor of claim 5, wherein the second zone is formed about a central axis of the combustion tube in the longitudinal direction of the combustion tube and allows a combustion product generated in the second zone to be delivered to the first zone, and
wherein the first zone protrudes further outward than the second zone along the central axis of the combustion tube.

7. The combustor of claim 1, further comprising:
a preliminary mixing chamber to which the injector is coupled and that is located on the inlet; and
a swirler provided in the preliminary mixing chamber and configured to supply a flow of air to the preliminary mixing chamber.

8. The combustor of claim 1, wherein an outer surface of the protrusion forms an outermost exterior of the combustion tube.

9. A combustor comprising:
a combustion tube including a wall having a cylindrical shape, an interior of the wall forming a combustion space where first and second fuel is combusted, the wall comprising:
an inlet through which the first fuel is introduced;
an outlet through which a gas generated when the first and second fuel is combusted is discharged; and
a protrusion protruding inward in a radial direction of the combustion tube from the wall between the inlet and the outlet in a longitudinal direction of the combustion tube, an outer surface of the protrusion forming an exterior of the combustion tube;
an injector configured to inject the first fuel into the combustion tube through the inlet of the combustion tube; and
an additional injector located on the protrusion of the combustion tube and configured to inject the second fuel into the combustion tube,
wherein the protrusion comprises:
a first inclined portion that is inclined toward the inlet of the combustion tube with respect to a surface of the wall of the combustion tube;
a second inclined portion that is inclined toward the inlet of the combustion tube with respect to the surface of the wall of the combustion tube; and
a connecting portion that extends parallel to the surface of the wall, connects the first inclined portion and the second inclined portion, and allows the additional injector to be located thereon.

10. The combustor of claim 9, wherein an inclination angle between the first inclined portion and the surface of the wall ranges from 20° to 60°.

11. The combustor of claim 9, wherein an inclination angle between the second inclined portion and the surface of the wall ranges from 10° to 90°.

12. The combustor of claim 9, wherein a plurality of air holes through which external air is delivered into the combustion tube are formed in the first inclined portion and the second inclined portion.

* * * * *